Patented Sept. 5, 1950

2,521,415

UNITED STATES PATENT OFFICE 2,521,415

STABILIZATION OF ORGANIC COMPOUNDS

Louis Schmerling, Riverside, Ill., assignor to Universal Oil Products Company, Chicago, Ill., a corporation of Delaware No Drawing. Application March 26, 1947, Serial No. 737,422

3 Claims. (Cl. 44—63)

This invention relates to the stabilization of organic compounds which tend to deteriorate in storage or in use due to oxidation reactions.

Various organic compounds including motor fuel, mineral oil, lubricating oil, drying oil, greases, rubber, etc., as well as various edible fats and oils, are adversely affected by oxygen, with the resultant formation of undesirable gum, discoloration, rancidity or other deleterious reactions. The invention is particularly applicable to the treatment of motor fuels comprising olefinic gasolines, such as cracked gasoline and polymer gasoline.

One object of the invention is to prevent or at least substantially retard the undesirable deterioration of organic compounds.

Another object of the invention is to provide a novel class of inhibitors which will function to stabilize organic compounds.

Still another object of the invention is to provide novel compositions of matter.

In one embodiment the present invention relates to a method of stabilizing an organic material subject to oxidative deterioration which comprises adding thereto an inhibitor comprising a hydroxyphenyl-isoindoline in an amount sufficient to retard said oxidative deterioration.

In a specific embodiment the present invention relates to a method of stabilizing cracked gasoline which comprises incorporating therein from about 0.0001% to about 0.1% by weight of N-(4-hydroxyphenyl)-isoindoline.

In still another embodiment the present invention relates to organic compounds and particularly motor fuels which tend to undergo deterioration by oxygen containing an inhibitor comprising a hydroxyphenyl-isoindoline.

The hydroxyphenyl-isoindolines of the present invention particularly include N-(4-hydroxyphenyl)-isoindoline of the following formula

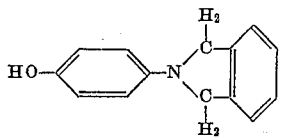

Compounds of this class may be prepared by reacting xylylene dihalide and particularly xylylene dibromide with p-aminophenol at a suitable temperature. It is understood that the aromatic rings and/or the heterocyclic ring may contain various further substituents including alkyl, aryl, aralkyl, alkaryl, alkoxy, aralkoxy, hydroxy, etc., radicals, and that these alternative, but not necessarily equivalent, compounds may be prepared by alkylating the above compound or by the use of appropriate starting materials in the preparation of the inhibitor of the present invention.

It will be noted that hydroxyphenyl isoindoline may or may not contain one double bond in the heterocyclic ring depending upon interpretation of the double bond of the aromatic ring.

In the preferred inhibitors of the present invention, the hydroxy radical attached to the aromatic ring is in a position para to the nitrogen atom. However, it is understood that compounds in which the hydroxy group is in the ortho or meta position are comprised within the scope of the present invention and that these various compounds are not necessarily of equivalent activity.

The inhibitor of the present invention will usually be added to gasoline in an amount of less than 0.5% by weight and generally will be utilized in an amount of from about 0.0001% to about 0.1%. The exact amount of inhibitor required will depend upon the particular organic compound being treated and upon the stability desired. These inhibitors may also be employed in connection with various dies, antiknock agents such as tetraethyl lead, metal deactivators or other additives employed for specific purposes in the organic compound.

The following example is introduced to illustrate further the novelty and utility of the present invention but not with the intention of unduly limiting the same.

N-(4-hydroxyphenyl)-isoindoline was prepared as follows: 16 g. of p-aminophenol and 13 g. of xylylene bromide were refluxed in he presence of 150 cc. of absolute ethyl alcohol at a temperature of 79° C. for 4 hours. The product was cooled and filtered to separate 12 grams of white nacreous flakes which were recrystallized from hot ethyl alcohol to recover the desired compound having a melting point of 215° C.

The above compound was tested as an inhibitor in cracked gasoline which had a blank induction period of 45 minutes. 0.005% of the compound prepared in the above manner increased the induction period of the cracked gasoline from 45 minutes to 285 minutes.

I claim as my invention:

1. Cracked gasoline containing from about 0.0001% to about 0.1% by weight of N-(4-hydroxyphenyl)-isoindoline.

2. Olefinic gasoline containing a small amount of N-(4-hydroxyphenyl)-isoindoline, sufficient to retard oxidative deterioration of the gasoline.

3. Cracked gasoline containing a small amount of N-(4-hydroxyphenyl)-isoindoline, sufficient to retard oxidative deterioration of the gasoline.

LOUIS SCHMERLING.

REFERENCES CITED

The following references are of record in the file of this patent:

UNITED STATES PATENTS

| Number | Name | Date |
|---|---|---|
| 1,899,050 | Reed | Feb. 28, 1933 |
| 2,071,064 | Downing | Feb. 16, 1937 |
| 2,201,553 | Bean | May 21, 1940 |
| 2,316,587 | Irigar | Apr. 13, 1943 |
| 2,352,020 | Schening et al. | June 20, 1944 |
| 2,387,751 | Dickey | Oct. 30, 1945 |
| 2,410,783 | Hardman | Nov. 5, 1946 |